May 14, 1935.                    C. KITTILSEN                    2,001,141
        TRANSMISSION FOR TRANSMITTING POWER AT DIFFERENT SPEED
            RATIOS FROM A DRIVER SHAFT TO A DRIVEN SHAFT
                       Filed March 5, 1934          2 Sheets-Sheet 1

Inventor:
Coom Kittilsen
By
    Attorney

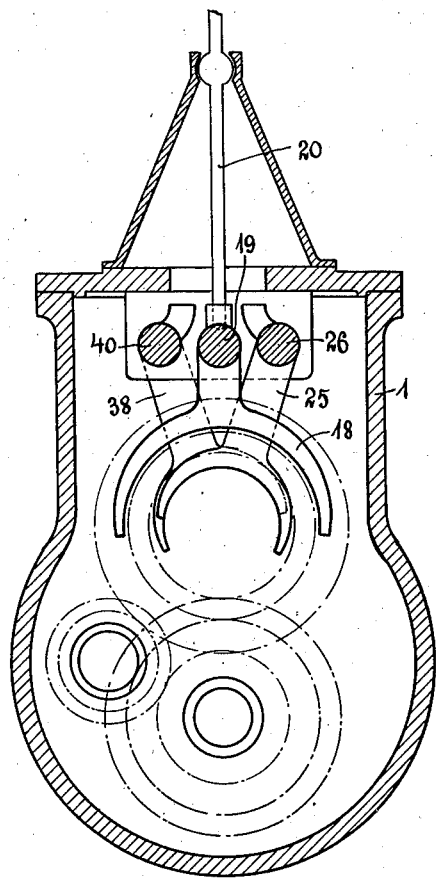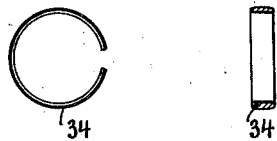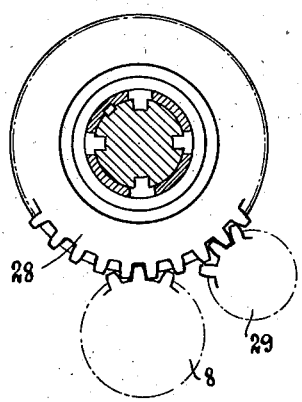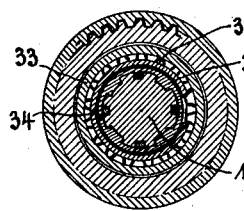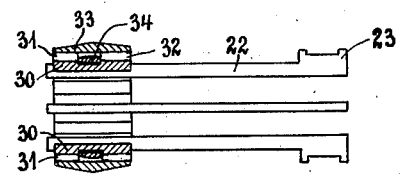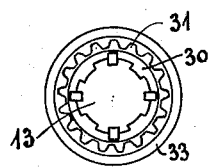

Patented May 14, 1935

2,001,141

UNITED STATES PATENT OFFICE 2,001,141

TRANSMISSION FOR TRANSMITTING POWER AT DIFFERENT SPEED RATIOS FROM A DRIVER SHAFT TO A DRIVEN SHAFT

Coom Kittilsen, Lille Trag, near Porsgrunn, Norway

Application March 5, 1934, Serial No. 714,191
In Norway July 31, 1933

2 Claims. (Cl. 74—339)

The object of the present invention is to provide a transmission which with a relatively small number of gears will be adapted to transmit power from the driver shaft to the driven shaft, both substantially aligned and at a number of speed ratios.

Another object of the invention is to provide means whereby the control of the several speeds may be actuated by one single lever, and whereby a direct connection can be established between the driver shaft and the driven shaft, at the same time as the necessary gears for transmitting power at other speed ratios are free and do not rotate.

A further object of the invention is to make a simple construction, whereby the power from the driver shaft to an ordinary lay shaft may be transmitted alternatively through one set of two gears or through another set of two gears, said pairs of gears being at the same time in mesh with each other.

A further object of this invention is to provide simple and effective means for synchronizing two toothed elements which are to be brought in mesh with each other, (for example co-axially or parallelly mounted) and which possibly at the time when they are going to be brought in mesh with each other have a different speed of rotation.

For the above and other objects which may be apparent from the following specification, the transmission according to this invention comprises a housing, wherein there is journalled a lay shaft, comprising a number of gears and means for journalling the driven shaft and the driver shaft.

It has previously been proposed to make arrangements somewhat similar to the above mentioned construction, but in these instances the construction has necessitated the use of a special short shaft on which one of the pinions has been journalled. According to this invention the construction is simplified so that no such extra shaft is needed.

In order that the invention shall be readily understood, it will be described with reference to the drawings which illustrate a transmission with three sets of gears and adapted to give four different speed ratios.

In the drawings:

Fig. 2 is a transverse cross section on the line II—II and illustrates the arrangement of the operating arms.

Fig. 4 is a section on line IV—IV in Fig. 1.

Fig. 5 is a detail, showing one synchronizer clutch arrangement.

Fig. 6 is a cross section on line VI—VI in Fig. 1.

Fig. 7 is an end view of the synchronizer clutch of Fig. 5, seen from the left side.

Fig. 8 is a detail of the spring ring and

Fig. 9 is a cross section through the spring ring.

Figure 1:
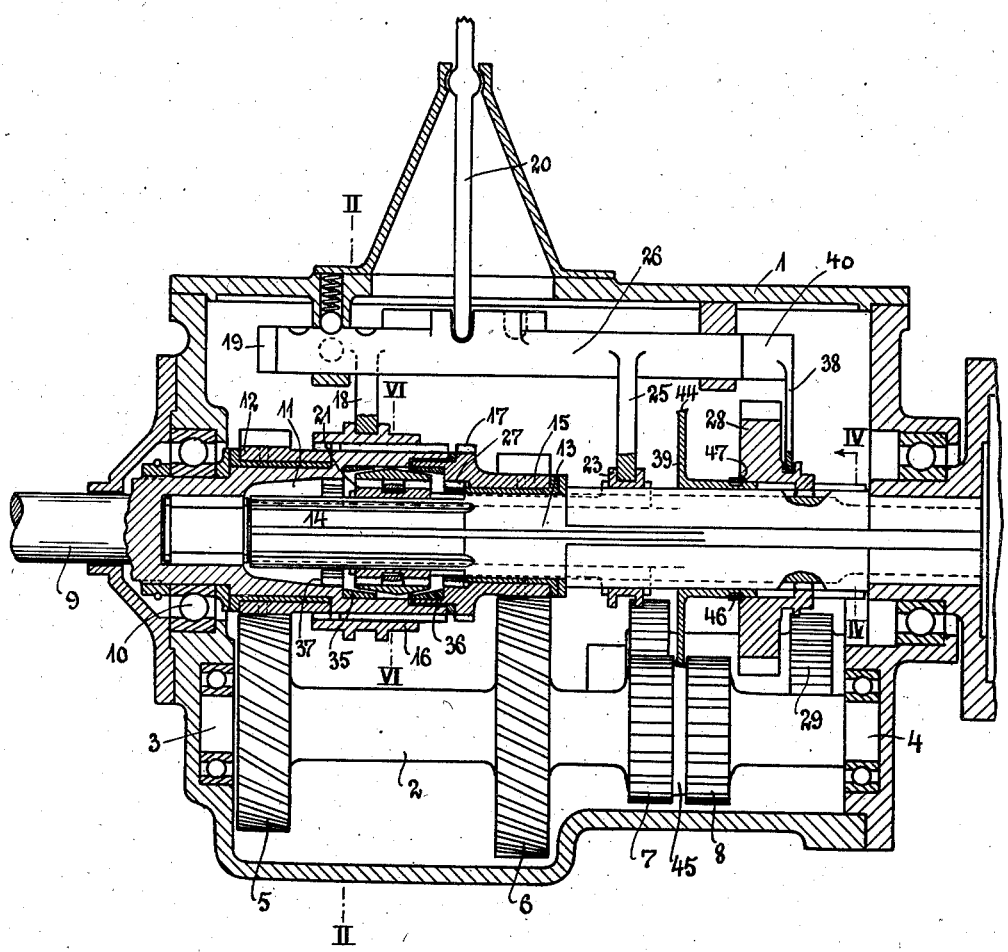
Fig. 1 is a longitudinal cross section through the transmission.

In the drawings, 1 denotes the housing for the transmission. In the housing is journalled a lay shaft 2 on suitable ball bearings 3, 4. On the lay shaft 2 there are keyed gears 5, 6, 7, 8. The driver shaft 9 is journalled on ball bearings 10 and extends into the transmission housing where the driver shaft is bored out so that a space 11 is established.

A pinion 12 is rotatably mounted on the shaft 9 and is in constant mesh with the gear 5 on the lay shaft 2. The driven shaft 13 has an extension 14 extending into the space 11 in the driver shaft 9. On the driven shaft 13 is rotatably mounted a pinion 15 which is in constant mesh with the gear 6 on the lay shaft 2. The driver shaft 9 extends beyond the place where the pinion 12 is journalled, and on the driver shaft there is arranged a sliding clutch 16 shown in its left position in the drawings and engaged with the pinion 12, whereby the pinion 12 will be keyed to the driver shaft 9 or the clutch may be moved to the right in the drawings and mesh with a number of extra teeth 17 which are built in unit with the pinion 15, whereby the pinion 15 will be keyed to the driver shaft 9.

From the above description it will be understood that by operating the clutch 16 by means of its operating lever 18, control bar 19 and the hand lever 20, it is possible to transmit the power from the driver shaft 9 to the lay shaft 2 either through the gears 12, 5 or through the gears 15, 6.

On the extension 14 of the driven shaft 13 there is further mounted a slidably, non-rotatably arranged clutch member 21 which is provided with rods 22 extending in grooves in the driven shaft to a ring 23 which is in contact with a fork 25 which in turn is controlled by a control bar 26. The clutch 21 may be moved to the left to engage teeth 31 with teeth 37 and thereby establish an engagement between the driven shaft 13 and the driver shaft 9. When at the same time the clutch 16 is moved to the neutral position, there will be no gears keyed to the driver shaft 9, and the power will be transmitted directly through the transmission without having any gears in rotation. If the clutch 21 is moved to the right, its teeth 32 will engage with teeth 27 which are in unit with the pinion 15, whereby this gear will be keyed to the driven shaft 13. If, with clutch 21 in the position to couple pinion 15 to shaft 13, the clutch 16 is moved to the left and brought in mesh with the gear 12, the power from the driver shaft 9 will be transmitted through the gears 12, 5 to the lay shaft 2, and from the lay shaft 2 through the gears 6, 15 to the driven shaft 13. By suitably sliding the gear 28 in mesh with the gear 8 or the gear 29, other combinations of ratios of transmission may be obtained, as explained hereinafter.

Figure 3:
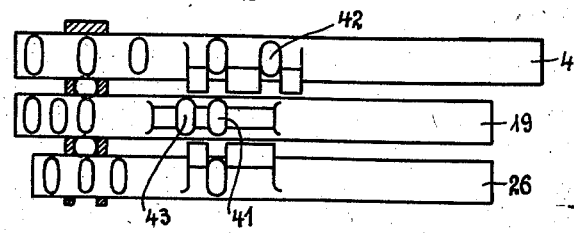
Fig. 3 is a plan view of the control bars.

In Fig. 3 a method of shifting the gears is illustrated. The rod 40 controls the movement of the gear 28. The rod 19 controls the clutch 16, and the rod 26 controls the synchronizer clutch 21.

When rod 26 is shifted from the neutral position shown in Fig. 1 to the left, direct drive will be obtained due to the coupling of clutch member 21 (splined to shaft 13) to the teeth 37 of shaft 9. If, however, rod 26 is shifted from the neutral position to the right pinion 15 will, by engagement between teeth 27 and teeth 32 of the clutch member 21, be coupled to shaft 13, and assuming clutch 16 to be in a position to couple pinion 12 to shaft 9, shaft 13 will rotate relative to shaft 9 at a ratio greater than 1:1.

To place the transmission in second gear, rod 19 is shifted to the left to cause clutch 16 to couple pinion 12 to shaft 9, rod 26 is shifted to its neutral position, and rod 40 is shifted to the left to cause gear 28 to mesh with gear 8. With this connection, rotary motion is transmitted from shaft 9 through pinion 12 to gear 5 through shaft 2, gear 8 to gear 28, and thence to shaft 13.

Low gear is obtained by shifting rod 19 to the right which couples pinion 15 to shaft 9 by means of clutch 16, by shifting rod 26 operating clutch 21 to neutral, and by shifting rod 40 controlling the position of gear 28 to the left to cause gear 28 to mesh with gear 8. Motion then is transmitted from shaft 9 to pinion 15, to gear 6, to shaft 2 and gear 8, to gear 28, and thence to shaft 13.

Reverse gear is obtained by shifting rod 19 to the right, rod 26 in neutral, and rod 40 to the right. Motion in this case is transmitted from shaft 9 to pinion 12, to gear 6, shaft 2 and gear 7, to the gear keyed to the shaft on which gear 29 is affixed, and from gear 29 to gear 28, and thence to shaft 13.

For placing the transmission in "extra" reverse, rods 19 and 26 are placed in the left and neutral positions, respectively, as in the case of second gear, but rod 40 is shifted to the right to bring gear 28 into mesh with gear 29. With the parts in this position, rotary motion is transmitted from shaft 9 through pinion 12 to gear 5 and shaft 2, from gear 7 on shaft 2 to a gear fixed on the shaft to which gear 29 is affixed, and from gear 29 to gear 28 and shaft 13.

In order to disengage all the gears when driving on direct, the lower end of the lever 20 is moved from the slot of the rod 26 to the second slot 43 of the rod 19 which it is now opposite to and the rod 19 is moved to the right, so as to put the clutch 16 in neutral position.

It is of special importance for the proper operation of the transmission according to this invention that the clutch members shall engage with corresponding teeth on the part which is to be meshed without unnecessary wear or noise. For this reason it is necessary to use a synchronizing arrangement.

The synchronizing arrangement according to this invention is illustrated in Fig. 1 in the clutch 21 and also in connection with the gears 28 and 8.

With reference to the clutch 21, this is illustrated in Figs. 5, 6 and 7 and comprises a primary movable member 30, comprising bars 22 which are connected to the ring 23 which again may be operated from the outside by means of a forked lever 25. The primary member 30 has a number of teeth 31 which may be brought in engagement with that part which is to be engaged, these teeth extending for a purpose to be described along the outside surface of the member 30. A secondary member 33 is arranged outside the primary member 30 and is fixed thereto by means of teeth corresponding to and meshing with the teeth 31. In the primary member, as well as in the teeth of the secondary member, there are arranged annular grooves which register with each other (Figs. 5 and 6). In the compartment which is thus established there is arranged a spring ring 34 which may be seen in Figs. 8 and 9. The spring ring has on the outside a spherical surface, and the annular groove in the member 33 is preferably also given a corresponding surface, while a cross section through the annular groove in the primary member 30 will be of more rectangular shape. The outside surface of the secondary member 33 corresponds to a double cone and in action works as a friction clutch.

In the construction shown in Fig. 1, the synchronizer clutch as above described is to be used to connect the driven shaft 13 to the driver shaft 9 or the driven shaft 13 to the pinion 15. For this reason the driver shaft 9 is provided with a conically shaped friction surface 35 and a corresponding surface 36 is arranged on the pinion 15.

When now the fork 25 by means of the control bar 26 is moved for instance towards the left, the friction surface on the secondary member 33 will be brought in engagement with the friction surface 35, and when more force is applied to the fork 25, the spring ring 35 will be compressed and the primary member of the clutch will be allowed to displace itself in axial direction relative to the secondary member, the spring ring following the primary member and being compressed to such an extent that the teeth of the secondary member can slide over the same. The teeth 31 on the primary member will thus come into mesh with the teeth 37 on the driver shaft; but before they contact with each other, both will have to be brought up to substantially the same speed due to the friction contact between the friction surface on the secondary member and the friction surface 35 on the driver shaft 9. The same will happen, if the fork arm 25 moves the clutch to the right.

If the synchronizing arrangement according to this invention is to be used in connection with the transmitting of power from one shaft to another shaft, arranged parallel to the first one, the construction must be modified to some extent in relation to that which has been described above.

The modified construction is shown in Fig. 1 in connection with the meshing of the gear 28 and 8. The gear 28 represents here the primary member which is moved to the left by means of the forked arm 38 and is mounted on the secondary member 39 slidable in the axial direction, but not rotatable. The secondary member 39 has a friction surface 44 which is adapted to come in frictional contact with the friction surface 45, arranged between the gears 7 and 8. In the surface of the secondary member 39 the ring 46 is arranged and may, if desired, be arranged just in front of the gear 28 and in such a way that the gear 28 has a small conical surface 47 which will make it possible for the gear 28 to compress the spring ring 46 and slide over this, when force is applied in the left direction by the forked arm 38. A synchronizing action will correspond to the synchronizing action described with the first embodiment. Thus, when the forked arm 38 applies force on the gear 28 in direction to the left, this force will be transmitted to some exent through the spring ring 46, through the secondary member 39 which with its frictional surface 44 will contact with the friction surface 45, whereby the gears 28 and 8 will be brought up to the same speed before they come in mesh with each other, which they will not do until the force from the arm 38 has become great enough to compress the spring ring 46 so that the gear will be allowed to slide over the same.

It must be understood that the invention in the foregoing has been described with reference to a specific preferred embodiment and that it is not limited to the construction described in this embodiment, but only to the appended claims.

I claim:—

1. A transmission for transmitting power at different speed ratios from a driver shaft to a driven shaft, arranged substantially in alignment with each other, and comprising an auxiliary lay shaft and two sets of gears in constant mesh with each other, one gear of each of these sets being mounted fixed to the said lay shaft and the other two gears respectively being rotatably mounted on the driver shaft and on the driven shaft, a sliding clutch being arranged non-rotatable on the end of the driver shaft and being provided with means for connecting one or the other of the said freely mounted gears directly to the driver shaft, the said driver shaft being hollow at its end and the said driven shaft having an extension projecting into said hollow, the internal diameter of the driver being so large in relation to the said extension of the driven shaft that a free annular space will remain between them, a sliding clutch being arranged on the said end of the driven shaft and means being arranged on the driver shaft and on the gear, freely mounted on the driven shaft to adapt the said clutch to engage alternately with the said driver shaft and with the said freely mounted gear on the driven shaft.

2. In a transmission between two aligned shafts the arrangement of two freely mounted pinions, one on the driver and one on the driven shaft, a clutch including a member splined on the driver shaft and provided with means for connecting alternately one or the other of the two said pinions with the said driver shaft, another clutch including a member splined on the driven shaft and provided with means for connecting the driver shaft directly with the driven shaft or alternately the driven shaft with the said freely mounted pinion on the driven shaft, rods for the control of the driven shaft carried clutch embedded in the said driven shaft, and a forked lever controlled sleeve for actuating said rods.

COOM KITTILSEN.